(12) United States Patent
Diego Gutierrez et al.

(10) Patent No.: US 12,079,546 B2
(45) Date of Patent: Sep. 3, 2024

(54) DIMENSIONS IN ADDITIVE MANUFACTURING

(71) Applicant: Hewlett-Packard Development Company, L.P., Spring, TX (US)

(72) Inventors: Victor Diego Gutierrez, Sant Cugat del Valles (ES); Manuel Freire Garcia, Sant Cugat del Valles (ES); Enrique Gurdiel Gonzalez, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 74 days.

(21) Appl. No.: 17/417,972

(22) PCT Filed: Apr. 30, 2019

(86) PCT No.: PCT/US2019/029839
§ 371 (c)(1),
(2) Date: Jun. 24, 2021

(87) PCT Pub. No.: WO2020/222788
PCT Pub. Date: Nov. 5, 2020

(65) Prior Publication Data
US 2022/0075348 A1 Mar. 10, 2022

(51) Int. Cl.
*G06F 30/10* (2020.01)
*B29C 64/386* (2017.01)
(Continued)

(52) U.S. Cl.
CPC ............ *G06F 30/10* (2020.01); *B29C 64/386* (2017.08); *B33Y 50/00* (2014.12);
(Continued)

(58) Field of Classification Search
CPC .. G06F 30/10; G06F 2119/18; G06F 2111/10; B33Y 50/00; B29C 64/386; G05B 19/40931; G05B 2219/35148
See application file for complete search history.

(56) References Cited

U.S. PATENT DOCUMENTS 11,597,153 B1 * 3/2023 Barbati ................ B29C 64/118
2003/0151167 A1 8/2003 Kritchman et al.
(Continued)

FOREIGN PATENT DOCUMENTS

| WO | 2018/140034 A1 | 8/2018 |
| WO | 2018/194623 A1 | 10/2018 |
| WO | WO-2018182513 A1 | 10/2018 |
| WO | 2018/209886 A1 | 11/2018 |

OTHER PUBLICATIONS

Islam, N., et al., "Dimensional Accuracy Achievable by three dimensional printing," In book: IAENG Transactions on Engineering Sciences, Apr. 2014, 6 pages.
(Continued)

*Primary Examiner* — Robert E Fennema
*Assistant Examiner* — Yvonne Trang Follansbee
(74) *Attorney, Agent, or Firm* — Michael Dryja

(57) ABSTRACT

In an example, a method includes obtaining an indication of a deviation from an expected dimension of at least one dimension of an object generated using an additive manufacturing apparatus. A geometrical compensation model to apply to object model data for generating objects using additive manufacturing to compensate for anticipated deviations in dimensions may be determined from the obtained indication. The geometrical compensation model may comprise a first value to apply to object model data to modify a specification of an external dimension; and a second, different, value to apply to object model data to modify a specification of an internal dimension.

10 Claims, 5 Drawing Sheets

Obtain an indication of a deviation from an expected dimension of at least one dimension of an object generated using an additive manufacturing apparatus — 102

Determine a geometrical compensation model to apply to object model data for generating objects using additive manufacturing to compensate for anticipated deviations in dimensions — 104

(51) Int. Cl.
  *B33Y 50/00* (2015.01)
  *G05B 19/4093* (2006.01)
  *G06F 111/10* (2020.01)
  *G06F 119/18* (2020.01)

(52) U.S. Cl.
  CPC .................. *G05B 19/40931* (2013.01); *G05B 2219/35148* (2013.01); *G06F 2111/10* (2020.01); *G06F 2119/18* (2020.01)

(56) References Cited

U.S. PATENT DOCUMENTS

| | | |
|---|---|---|
| 2016/0320771 A1 | 11/2016 | Huang |
| 2017/0239719 A1 | 8/2017 | Buller et al. |
| 2017/0310935 A1 | 10/2017 | Sinclair |
| 2017/0332976 A1 | 11/2017 | Al-Ali |
| 2017/0368753 A1* | 12/2017 | Yang .................... G01B 21/20 |
| 2018/0040131 A1 | 2/2018 | Zeng et al. |
| 2018/0095450 A1* | 4/2018 | Lappas .................... G06T 19/00 |
| 2018/0250774 A1 | 9/2018 | Symeonidis et al. |
| 2019/0054700 A1 | 2/2019 | Chandar et al. |

OTHER PUBLICATIONS

Kacmarcik, J., et al., "An Investigation of geometrical accuracy of desktop 3D printer using CMM," IOP Conference Series Materials Science and Engineering, vol. 393, Issue 1, 2018, 11 pages.

Kechagias, J. D., et al., "Dimensional Accuracy Optimization of Prototypes produced by Polyjet Direct 3D Printing Technology," Conference: Proceedings of the International Conference on Industrial Engineering—INDE '14At: Santorini Island, Greece, Jul. 2014, pp. 61-65.

Lemu, H., et al., "3D Printing for Rapid Manufacturing; Study of Dimensional and Geometrical Accuracy," IFIP Advances in Information and Communication Technology, Jan. 2012, vol. 384, 11 pages.

Islam, et al., An experimental investigation into the dimensional error of powder-binder three-dimensional printing, The International Journal of Advanced Manufacturing Technology, Feb. 2016, vol. 82, Issue 5-8, pp. 1371-1380.

Simplify3D User Forum, Size difference from software to print?, Oct. 7, 2016, 5 pages, available at: https://forum.simplify3d.com/viewtopic.php?f=9&t=6130.

Ulas Yaman, Shrinkage compensation of holes via shrinkage of interior structure in FDM process, The International Journal of Advanced Manufacturing Technology, Feb. 2018, vol. 94, Issue 5-8, pp. 2187-2197.

Mueller et al., "The effect of build orientation on the mechanical properties in inkjet 3D printing", In 2015 International Solid Freeform Fabrication Symposium. University of Texas at Austin, 2015, pp. 983-992.

Wang et al., "In-plane shape-deviation modeling and compensation for fused deposition modeling processes", IEEE Transactions on Automation Science and Engineering, vol. 14, No. 2, 2016, pp. 968-976.

* cited by examiner $$y = 0.113 + 0.010x$$

DIMENSIONS IN ADDITIVE MANUFACTURING

BACKGROUND

Additive manufacturing techniques may generate a three-dimensional object through the solidification of a build material, for example on a layer-by-layer basis. In examples of such techniques, build material may be supplied in a layer-wise manner and the solidification method may include heating the layers of build material to cause melting in selected regions. In other techniques, chemical solidification methods may be used.

BRIEF DESCRIPTION OF DRAWINGS

Non-limiting examples will now be described with reference to the accompanying drawings, in which.

DETAILED DESCRIPTION

Figure 1:
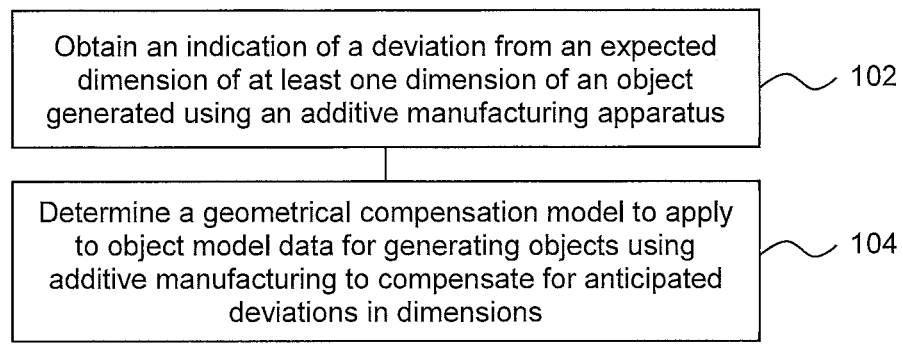
FIG. 1 is a flowchart of an example method of determining a geometrical compensation model for use in additive manufacturing.

Additive manufacturing techniques may generate a three-dimensional object through the solidification of a build material. In some examples, the build material is a powder-like granular material, which may for example be a plastic, ceramic or metal powder and the properties of generated objects may depend on the type of build material and the type of solidification mechanism used. In some examples the powder may be formed from, or may include, short fibres that may, for example, have been cut into short lengths from long strands or threads of material. Build material may be deposited, for example on a print bed and processed layer by layer, for example within a fabrication chamber. According to one example, a suitable build material may be PA12 build material commercially referred to as V1R10A "HP PA12" available from HP Inc.

In some examples, selective solidification is achieved using heat in a thermal fusing additive manufacturing operation. This may comprise directional application of energy, for example using a laser or electron beam which results in solidification of build material where the directional energy is applied. In other examples, at least one print agent may be selectively applied to the build material, and may be liquid when applied. For example, a fusing agent (also termed a 'coalescence agent' or 'coalescing agent') may be selectively distributed onto portions of a layer of build material in a pattern derived from data representing a slice of a three-dimensional object to be generated (which may for example be generated from structural design data). The fusing agent may have a composition which absorbs energy such that, when energy (for example, heat) is applied to the layer, the build material heats up, coalesces and solidifies upon cooling, to form a slice of the three-dimensional object in accordance with the pattern. In other examples, coalescence may be achieved in some other manner.

According to one example, a suitable fusing agent may be an ink-type formulation comprising carbon black, such as, for example, the fusing agent formulation commercially referred to as V1Q60A "HP fusing agent" available from HP Inc. In one example such a fusing agent may comprise any or any combination of an infra-red light absorber, a near infra-red light absorber, a visible light absorber and a UV light absorber. Examples of print agents comprising visible light enhancers are dye based colored ink and pigment based colored ink, such as inks commercially referred to as CE039A and CE042A available from HP Inc.

In addition to a fusing agent, in some examples, a print agent may comprise a coalescence modifier agent, which acts to modify the effects of a fusing agent for example by reducing or increasing coalescence or to assist in producing a particular finish or appearance to an object, and such agents may therefore be termed detailing agents. In some examples, detailing agent may be used near edge surfaces of an object being printed to reduce or prevent coalescence by, for example, cooling the build material or through some other mechanism. According to one example, a suitable detailing agent may be a formulation commercially referred to as V1Q61A "HP detailing agent" available from HP Inc. A coloring agent, for example comprising a dye or colorant, may in some examples be used as a fusing agent or a coalescence modifier agent, and/or as a print agent to provide a particular color for the object.

As noted above, additive manufacturing systems may generate objects based on structural design data. This may involve a designer generating a three-dimensional model of an object to be generated, for example using a computer aided design (CAD) application. The model may define the solid portions of the object. To generate a three-dimensional object from the model using an additive manufacturing system, the model data can be processed to derive slices of parallel planes of the model. Each slice may define a portion of a respective layer of build material that is to be solidified or caused to coalesce by the additive manufacturing system.

FIG. 1 is an example of a method, which may comprise a computer implemented method of determining a geometrical compensation model, which may for example be used to modify object model data. The object model data may be modified to compensate for anticipated deviations in dimensions when generating an object.

In some examples, geometrical transformations may be used to derive modifications of object model data, for example to apply a geometrical compensation in order to compensate for anticipated deviations in dimensions when generating an object.

For example, it may be the case that, where an object is generated in a process which includes heat, additional build material may adhere to the object on generation. In one example, fusing agent may be associated with a region of the layer which is intended to fuse. However, when energy is supplied, build material of neighbouring regions may become heated and fuse to the outside of the object (in some examples, being fully or partially melted, or adhering to melted build material as powder). Therefore, a dimension of an object may be larger than the regions to which fusing agent is applied. In order to compensate for this effect, i.e. where it is anticipated that an object may tend to 'grow' during manufacture in this manner, the object volume as described in object model data may be reduced to compensate for such growth.

In other examples, objects may be smaller following object generation than is specified in object model data. For example, some build materials used to generate objects may shrink on cooling. Therefore, a geometrical compensation/transformation model may specify at least one geometrical compensation parameter to in turn specify how an object volume in object model data should be increased to compensate for the anticipated reduction in volume.

A particular object may be subject to mechanisms which result in growth and/or shrinkage, and the appropriate transformation to apply may be influenced by the different degrees to which an object may be affected by such processes.

Geometrical compensation models may specify at least one scaling factor and/or at least one offset value, and in some examples associate a scaling factor and/or offset value with one of three orthogonal (e.g. x, y and z) axes. For example, a scaling factor may be used to multiply all specified dimensions in the direction of an axis by a value, which may be greater than 1 in order to increase the dimensions and less than 1 to reduce the dimensions. An offset value may specify, for example by a specified distance (which may be specified in predefined units, for example standard units such as millimeters or addressable units such as pixels or 'voxels' as are discussed in greater detail below), an amount to add or remove from a surface of the object (or a perimeter within a layer). For example, a distance as measured in the direction of a normal from the object surface may be specified and the object may be eroded or dilated (i.e., inflated or enlarged) by this distance. Therefore, in order to compensate for an anticipated deviation in a given axis, a scaling factor and/or offset value may be used.

The method comprises, in block 102, obtaining an indication of a deviation from an expected dimension of at least one dimension of an object generated using an additive manufacturing apparatus. In some examples, the deviation may be obtained by measuring at least one dimension of an object generated according to object model data and comparing the measured dimension with an expected dimension e.g., by subtracting the expected dimension from the measured dimension. In some examples, indications of a plurality of deviations of dimensions of at least one object (and in some examples, a plurality of objects) are obtained. For example, these dimensions may be measured by a 3D scanner, manually, optically, automatically or in some other way. In other examples, the indications of deviations may comprise the measurements themselves, which may then be compared to expected measurements. The measurements may for example be received from a memory, or over a communications link, or may be determined directly by the processor(s). The method further comprises, in block 104, determining, using at least one processor (which may be the same as the processor(s) referred to in relation to block 102) and based on the obtained indication, a geometrical compensation model to apply to object model data for generating objects using additive manufacturing to compensate for anticipated deviations in dimensions. The geometrical compensation model comprises a first value to apply to object model data to modify a specification of an external dimension. The geometrical compensation model further comprises a second, different, value to apply to object model data to modify a specification of an internal dimension.

Such object model data may for example comprise data representing at least a portion (in some examples, a slice) of an object to be generated by an additive manufacturing apparatus by fusing a build material. The object model data may for example comprise a Computer Aided Design (CAD) model, and/or may for example be a STereoLithographic (STL) data file. In some examples, the object model data may represent the object or object portion as a plurality of sub-volumes, wherein each sub-volume represents a region of the object which is individually addressable in object generation. In some examples herein, the sub-volumes may be referred to as voxels, i.e. three-dimensional pixels.

Figures 2A, 2B:
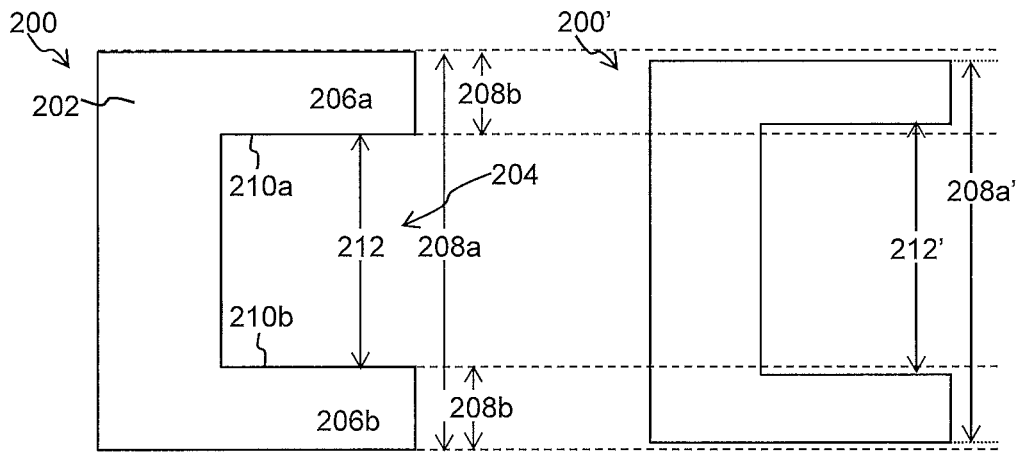
FIGS. 2a and 2b respectively show a schematic representation of two example objects.

An example of an object having internal and external dimensions is shown in FIGS. 2a and 2b. FIG. 2a depicts a cross-section of an example object 200 having a body 202 that has a rectangular cross-section with a rectangular-shaped aperture 204 in one side of the body 202, creating parallel extending arms 206a, 206b either side of the aperture 204.

The length 208a of the body 202 may be considered an external dimension. External dimensions may for example include those which are formed between surfaces which may be associated with a normal vector directed away from the respective surface of the object which would not intersect. In this case, such a normal vector would be formed from the top and bottom of the object, and would not intersect. Similarly, the width of the arms 206 is an external dimension 208b.

However, the length of the aperture 204 between the arms itself may be considered to represent an internal dimension 212 (e.g. when measured from the internal side 210a to the opposite internal side 210b of the aperture 204) of the object 200. In this case, the corresponding normal vectors would intersect. In other examples, it may be determined if a vector from one end of the measurement and directed away from the object along the length of the measurement would intersect with the other end of the measured dimension. This may be the case for internal dimensions but not for external dimensions.

In other examples, the internal and/or external dimensions may be labelled (for example, identified and 'tagged' by a user).

While compensation models to apply to external dimensions have been proposed, the inventors have realised that there may be circumstances where a geometrical compensation is to be applied to object model data for generating an object with external and internal dimensions, and that existing models may not handle these appropriately. For example, while the geometrical compensation model may compensate for anticipated deviations to at least one external dimension of the object, this same geometrical compensation model may not necessarily appropriately compensate for anticipated deviations to at least one internal dimension of the object. In other words, if only external dimensions are considered when applying a compensation, a generated object that is intended to achieve a certain dimensional tolerance may be less likely to achieve this dimensional tolerance for internal dimensions of the object than for external dimensions, and indeed as explained below, applying a compensation determined using external dimensions to internal dimensions may decrease accuracy. However, for example where an aperture or cavity is to receive another part with a precision fit, it may be the case that the accuracy of internal dimensions is a high priority.

This circumstance is illustrated by the object 200' of FIG. 2b. In this example, the object 200' was intended to have the dimensions of the object 200 shown in FIG. 2a but some shrinkage has occurred (e.g. when the object 200' has been formed after cooling, for example). This shrinkage depicted by FIG. 2b may be considered to be exaggerated so as to demonstrate the effect of shrinkage more clearly.

As can be seen, while the external dimensions have decreased (208a' is smaller than 208a), the internal dimension 212' has increased compared to the internal dimension 212 in FIG. 2a.

In order to compensate for shrinkage, it may be proposed to provide a compensation in which object model dimensions are modified through application of an offset and/or a scaling factor. For example, to consider a single dimension x which extends between vertexes are arranged at $x_1=1$ and $x_2=2$.

If an offset of 0.1 is to be applied to this dimension, then the spacing of the vertices may increase (e.g. in one example for applying such an offset to x may result in new vertices at $x'_1=0.95$ and $x'_2=2.05$). The dimension x' as a whole has increased from a magnitude of 1 unit to 1.1 units, and this will compensate for shrinkage in external dimensions (i.e. it may be anticipated that the physical points of the object corresponding to the vertices will be spaced by 1 unit after the object has been generated an undergone shrinkage). If however the dimension x is an internal dimension, then to compensate for the shrinkage, the object model vertices should be moved closer together (e.g. it may be appropriate to shift the vertices to $x'_1=1.05$ and $x'_2=1.95$). The dimension x' as a whole in this case will decrease, from a magnitude of 1 unit to 0.9 units to compensate for the shrinkage away from the location of the physical location corresponding to the vertices. The method of FIG. 1 proposes including such considerations in a geometrical compensation model.

Another example may consider scaling factors. If a scaling factor of 10% is applied to external dimensions, then, this may for example mean that the vertexes are redefined, for example (depending on how scaling is applied), as $x'_1=1.1$ and $x'_2=2.2$. As respective external dimensions, they will be further apart (separated by 1.1 instead of 1), allowing for 10% shrinkage, such that the separation is closer to the intended 1 unit of the original object model data. However, if these vertices are internal dimensions, applying that same scaling factor will mean that the vertices have been shifted in the same direction as the equivalent points in space will be shifted when shrinkage occurs, and the scaling factor will exacerbate rather than counteract the effect of the shrinkage—the overall length of the separation of the arms following shrinkage may be around 1.2 units, which is further from the 1 unit specified in object model data than if no scaling had been applied. Therefore, instead, in one example, a model as proposed in FIG. 1 may be developed to include a scaling factor of less than 1, for example of 0.9 (i.e. a 10% shrinkage), which is to be applied with respect to internal measurements.

A similar analysis may be applied to compensating for object growth rather than to shrinkage.

The method of FIG. 1 addresses the difference in internal and external measurements by a determining a geometrical compensation model which has a first value to modify a specification of an external dimension and a second, different, value to modify a specification of an internal dimension. In this way, the geometrical compensation model may compensate for anticipated deviations to both external and internal dimensions of a generated object. This allows appropriate scaling to be applied to both internal and external dimensions (rather than providing a model which addresses just the external dimensions, for example). Moreover, both internal and external dimensions may be used to contribute to such a model in some examples.

In some examples, at least one component of the first value is equal in magnitude, but has an opposite sign, to a corresponding component of the second value (e.g. an offset factor). In some examples, a component of the first and second values is derived based on at least one of an offset value and a scaling factor. In some examples, the offset value that is applied to object model data representative of an external dimension is equal in magnitude, but has an opposite sign, to the corresponding offset value that is applied to object model data representative of an internal dimension. In some examples, the scaling factor that is applied to object model data representative of an external dimension is mathematically the inverse transformation to the corresponding scaling factor that is applied to object model data representative of an internal dimension (for example, 1.1 represents a 10% increase, 0.9 represents a 10% decrease). In another example, the value may be the value of the total shift to be applied after both a scaling an offset factor are taken into account.

Figure 3A:
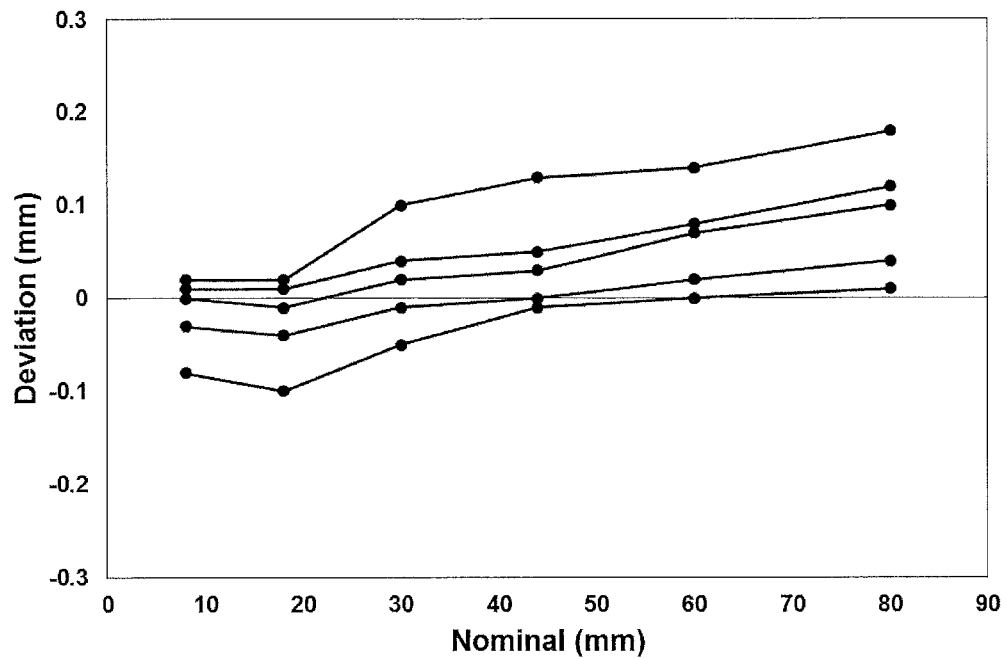
FIGS. 3a to 3c are example deviation histograms showing a sequence of transformations to datasets representative of measured dimensions of an object.
Figure 3B:
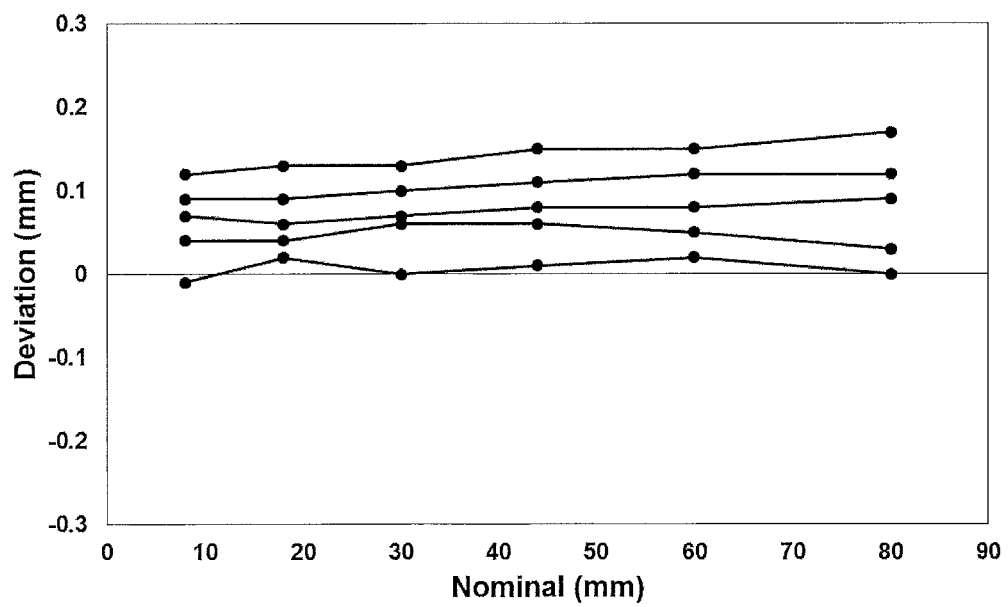
Figure 3C:
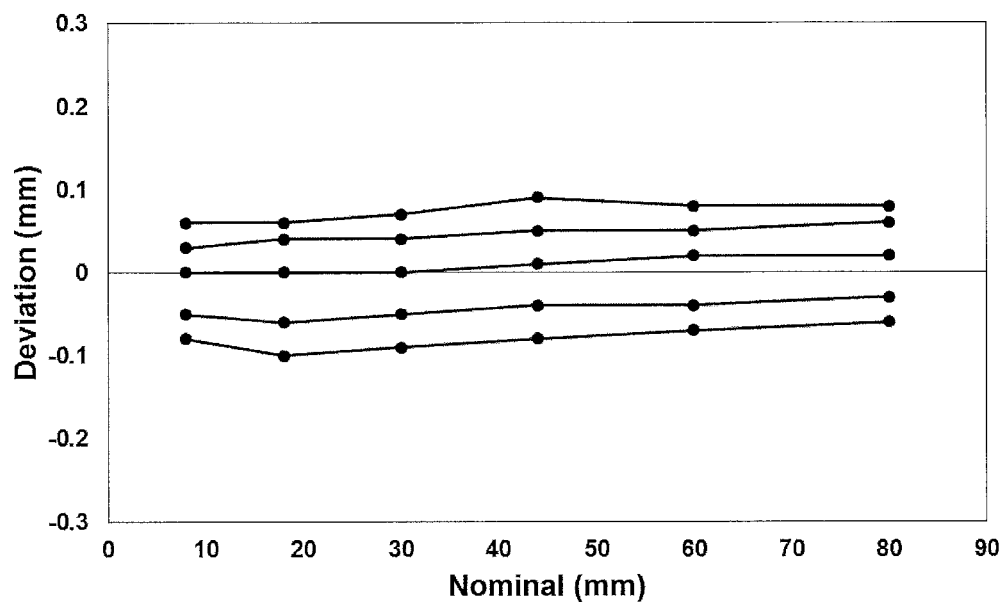

The effect of applying the first and second values to a geometrical compensation model can be better understood with reference to FIGS. 3a to 3c.

FIGS. 3a to 3c show an example sequence of deviation histograms for generated objects to illustrate the transformation effect of a scaling factor and an offset value on the deviations, when considering only the external dimensions.

FIG. 3a shows a deviation histogram where five sets of measurements have been taken of certain dimensions of five generated objects. The x-axis represents the nominal value (in mm) of certain dimensions of a generated object. The nominal value is an example of an expected (e.g., intended) dimension of the object. The y-axis represents the measured deviation value (in mm) for the nominal values. The histogram demonstrates that the spread of deviations increases with increasing nominal value in this example, as deviations in this example are cumulative in nature.

FIG. 3b demonstrates the transformation effect of a scaling factor, "s", applied to the data represented by FIG. 3a. The scaling factor, s, is intended to make the spread of deviations flatter across the range of nominal values. Accordingly, a scaling factor, s, is found such that the expression m*s−n is close to some value, for every dimension, where "m" is the measured dimension and "n" is its respective nominal value. The value m*s−n is the simulated error after applying the scaling transformation. A goal is to make this error as uniform as possible across the range of nominal values. By comparing FIGS. 3a and 3b, it can be seen that by finding an appropriate scaling factor, the deviation histogram can be made more uniform across the range of nominal values.

FIG. 3c demonstrates another transformation effect based on application of an offset value. The offset transformation attempts to adjust the relatively uniform histogram of FIG. 3b to obtain a deviation value of 0 (zero), or as close as possible to 0, across the range of nominal values. Accordingly, an offset value, "o", is applied after the scaling transformation such that m*s+o−n is as close to 0 (zero) as possible. In other words, m*s+o is as close to the nominal value, n, as possible. The deviation distribution across the range of nominal values shown in FIG. 3c is therefore as uniform as possible and as close to 0 as possible.

While the approach demonstrated by FIGS. 3a to 3c may work for external dimensions, for example, an adapted approach is proposed for when internal dimensions are to be taken into account. As discussed above, in examples herein, the offset transformation applies in the opposite way for internal dimensions as opposed to external dimensions.

Thus, for example, if an internal dimension measures more than it should (i.e. more than its nominal value) and a certain offset value is applied via the transformation to compensate for e.g., an external dimension measuring less than it should (i.e., less than its nominal value), the modified internal dimension may measure even more than before the certain offset value was applied to the object model data. In other words, this certain offset value compensates for deviations in the internal dimensions in the opposite way to the external dimensions of the object.

To avoid this potential issue, one example approach is to consider the "o" value (i.e., the value to be approximated through the operation m*s−n during the scaling transformation) as negative (i.e., equal in magnitude but opposite in sign) for internal dimensions. In other words, the operation m*s−n is approximated as being as close as possible to the value "o" for external dimensions and to the value "−o" for the internal dimensions. In practice, it may be the case that it is sufficient to increase the accuracy by applying different offsets ("o" or "−o" as appropriate), while using the same scaling factor, when applying the compensation to internal and external directions. The scaling factor may in some examples be determined for application to both internal and offset dimensions.

The transformation operation in terms of applying the offset value therefore works in opposite ways for external and internal values. Thus, the scaling transformation modifies the deviation data so that the internal and external dimensions can be compensated with the appropriate offset value. In some examples, a 'best fit' solution of s and o which satisfies both:

m*s−n=o for external dimensions and
m*s−n=−o for internal dimensions.

It has been found that if the deviation histogram has been well adjusted based on the value "o" or "−o" depending on whether the dimension(s) are external or internal, respectively, the offset transformation by size "0" moves the deviation values for the external and internal dimensions in opposite directions, with the goal of adjusting all of these values towards 0 (e.g., in the manner shown by FIGS. 3a to 3c). In other words, the corrected measure m*s+o or m*s−o as appropriate is close to the nominal.

Figure 4:
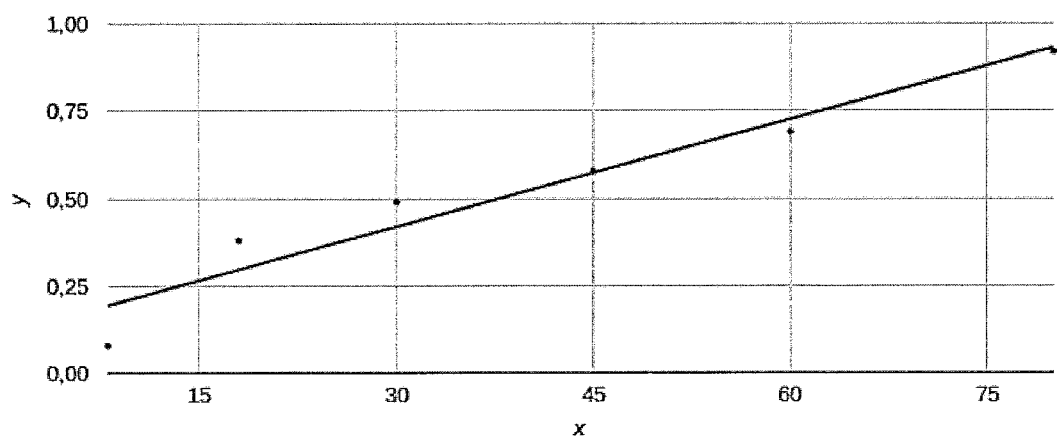
FIG. 4 is an example scatter graph including a dataset representative of measured dimensions of an object.

One way to calculate to the scaling factor, s, and the offset value, "o", is to calculate the regression line of the deviation data. Thus, in some examples determining the geometrical compensation model comprises fitting a linear regression line to a dataset comprising measured deviations from corresponding nominal dimensions of a generated object as a function of the nominal dimensions. FIG. 4 shows such an example of a regression line obtained using this approach. In FIG. 4, the sample deviations are mathematically optimally corrected by the regression line parameters. The equation of the line is y=0.113+0.010x. Accordingly, a scaling factor of 101% (1+0.010) and an offset value of 0.113 can be applied to object model data to modify a specification of the external and internal dimensions (with the offset value 0.113 and −0.113 applying depending on whether external or internal dimensions are being considered).

In some examples, in order to apply the method to internal dimensions, the method may comprise multiplying the nominal value and the deviation value by −1 (minus 1). In general, for an array of nominals $n_i$ and its respective deviations $d_i$, a regression line may be described by the scaling factor, s, and the value, o, according to the expression $s*n_i+o \approx d_i$, where "i" is the i-th dimension in the array. Multiplying both sides of the expression by −1 (minus 1) yields the expression $s*(-n_i)-o \approx -d_i$. Thus, for the internal dimensions, changing the nominal value and the deviation in the opposite way to the expression for the external dimensions, the regression line is adjusted with the offset "−o" instead of "o". It is therefore possible to include this example in the geometrical compensation model.

In other examples, other data fitting techniques may be used to derive suitable compensations. By being able to correct for external and internal dimensions in generated objects, it may be possible to meet demand for manufacturing objects with a predetermined dimensional accuracy where the accuracy is to be determined with reference to both external and internal dimensions.

Figure 5:
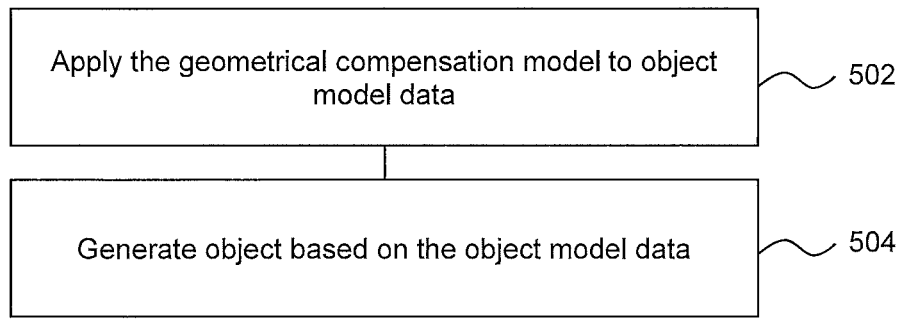
FIG. 5 is a flowchart of an example method of object generation.

FIG. 5 depicts an example method, which may follow the method of FIG. 1. The method comprises, in block 502, applying the geometrical compensation model to object model data to generate modified object model data. The object model data may be processed to generate print instructions (or object generation instructions), which in some examples may specify an amount of print agent to be applied to each of a plurality of locations on a layer of build material. For example, generating print instructions may comprise determining 'slices' of a virtual fabrication chamber, and rasterising these slices into pixels (or voxels, i.e. three-dimensional pixels). An amount of print agent (or no print agent) may be associated with each of the pixels/voxels. For example, if a pixel relates to a region of a fabrication chamber which is intended to solidify, the print instructions may be generated to specify that fusing agent should be applied to a corresponding region of build material in object generation. If however a pixel relates to a region of the fabrication chamber which is intended to remain unsolidified, then print instructions may be generated to specify that no agent, or a coalescence modifying agent such as a detailing agent, may be applied thereto. In addition, the amounts of such agents may be specified in the print instructions and these amounts may be determined based on, for example, thermal considerations and the like.

The method further comprises, in block 504, generating an object based on the modified object model data, for example using print instructions generated as described above. For example, this may comprise forming a layer of build material, applying print agents, for example through use of 'inkjet' liquid distribution technologies in locations specified in the object model data for an object model slice corresponding to that layer using at least one print agent applicator, and applying energy, for example heat, to the layer. Some techniques allow for accurate placement of print agent on a build material, for example by using printheads operated according to inkjet principles of two-dimensional printing to apply print agents, which in some examples may be controlled to apply print agents with a resolution of around 600 dpi, or 1200 dpi. A further layer of build material may then be formed and the process repeated, for example with the object model data for the next slice.

By generating an object after applying the model defined in FIG. 1, an object once formed may end up being closer to an intended size with respect to both its internal and external dimensions.

In some examples, the methods set out herein may be combined with other methods of object model modification, which may include other object compensation models. However, there may be additional factors considered. For example, a modification function may be employed in the vicinity, or locality, of small features. An erosion of such small features may result in an unacceptable reduction in their size, either obliterating the feature or rendering it too small to fuse or too delicate to survive cleaning operations.

For example, if a feature has a dimension of around 0.5 mm, this may correspond to 12 voxels at 600 dpi. If three or four voxels are eroded from the side of such a small feature, it will lose approximately 50 to 60% of its cross-section, reducing its size to less than 0.3 mm. Such a feature may be too small to survive cleaning operations. Thus, in some examples, other functions may be used to ensure that small features are preserved.

Figure 6:
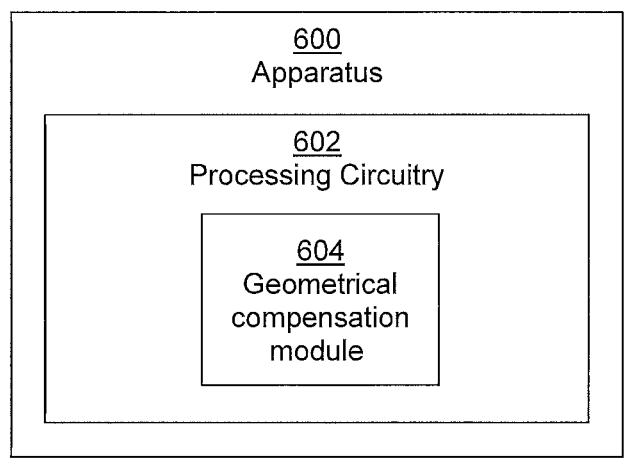
FIGS. 6 and 7 are simplified schematic drawings of example apparatus for additive manufacturing.

FIG. 6 shows an apparatus 600 comprising processing circuitry 602. The processing circuitry 602 comprises a geometrical compensation module 604.

In use of the apparatus 600, the geometrical compensation module 604 applies a compensation (e.g., a geometrical compensation model, or the like) to object model data describing an object to be generated in additive manufacturing to correct for anticipated variations in dimensions. In particular, in use of the apparatus 600, the geometrical compensation module 604 applies a compensation using a first value to object model data to correct for anticipated variations (e.g., deviations) in an external dimension of the object; and a second, different, value to object model data to correct for anticipated variations in an internal dimension of the object. For example, the geometrical compensation module 604 may apply model defined as described in relation to blocks 102-104 of FIG. 1.

In some examples, at least one part of the first value is equal to the negative of a corresponding part of the second value. In some examples, at least one part of the first and second values comprises at least one of an offset value and a scaling factor. In some examples, at least one of the offset value and the scaling factor that is applied to object model data representative of (or in respect to) an external dimension is equal the negative of a corresponding offset value and the scaling factor that is applied to object model data representative of (or in respect to) an internal dimension.

Figure 7:
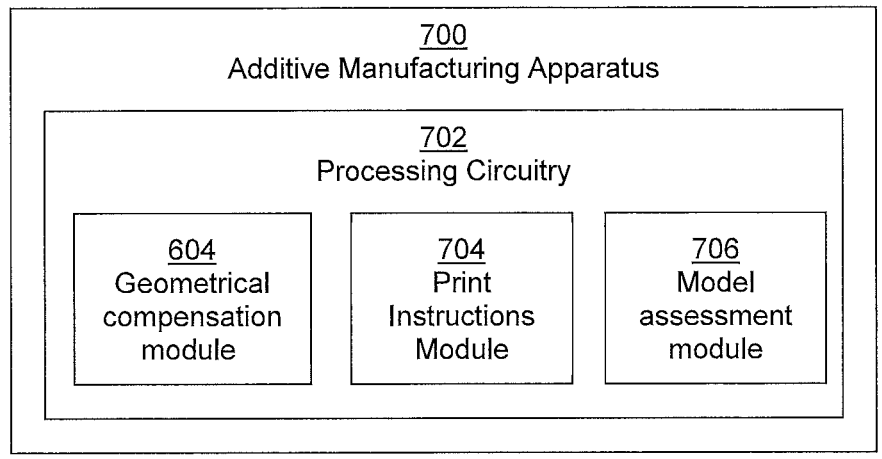

FIG. 7 shows additive manufacturing apparatus 700 to generate an object comprising processing circuitry 702. The processing circuitry 702 comprises the geometrical compensation module 604 and further comprises and a print instructions module 704 and a model assessment module 706.

In use of the apparatus 700, the model assessment module 706 may identify the internal and external dimensions of the object from the object model data. For example, the model assessment module 706 may be capable of distinguishing between internal and external dimensions of the object, and may provide these dimensions for use in any other module of the apparatus 700. For example, the model assessment module 706 may use 'tags' provided in object model data, or may analyze such data to determine whether identified dimensions are internal or external, for example using vectors as discussed above.

The print instructions module 704, in use of the additive manufacturing apparatus 700, determines print instructions for generating the object from data representing a modified virtual object, i.e. object model data to which a compensation has been applied by the geometrical compensation module 604. The print instructions (or object generation instructions) may, in use thereof, control the additive manufacturing apparatus 700 to generate each of a plurality of layers of the object. This may for example comprise specifying area coverage(s) for print agents such as fusing agents, colorants, detailing agents and the like. In some examples, object generation parameters are associated with object model sub-volumes (voxels or pixels). In some examples, the print instructions comprise a print agent amount associated with sub-volumes. In some examples, other parameters, such as any, or any combination of heating temperatures, build material choices, an intent of the print mode, and the like, may be specified. In some examples, halftoning may be applied to determine where to place fusing agent or the like.

The additive manufacturing apparatus 700, in use thereof, generates the object in a plurality of layers (which may correspond to respective slices of an object model) according to the print instructions. The additive manufacturing apparatus 700 may for example generate an object in a layer-wise manner by selectively solidifying portions of layers of build material. The selective solidification may in some examples be achieved by selectively applying print agents, for example through use of 'inkjet' liquid distribution technologies, and applying energy, for example heat, to the layer. The additive manufacturing apparatus 700 may comprise additional components not shown herein, for example any or any combination of a fabrication chamber, a print bed, printhead(s) for distributing print agents, a build material distribution system for providing layers of build material, energy sources such as heat lamps and the like.

The processing circuitry 602, 702 or the modules thereof may carry out any or any combination of the blocks of FIG. 1 and/or the blocks of FIG. 5.

Figure 8:
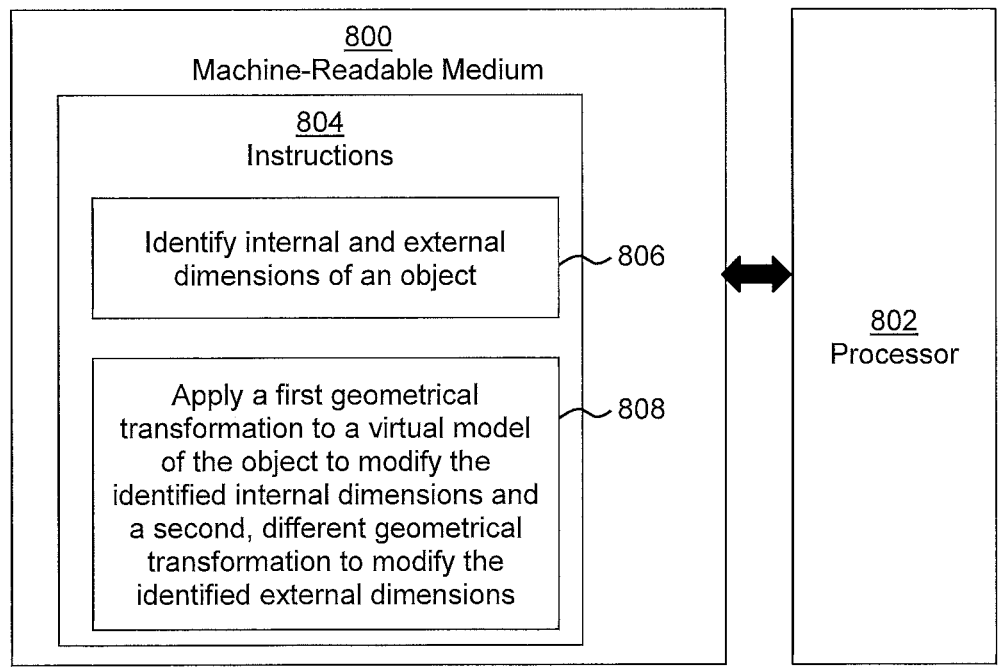
FIG. 8 is a simplified schematic drawing of an example machine-readable medium associated with a processor.

FIG. 8 shows a tangible machine-readable medium 800 associated with a processor 802. The machine-readable medium 800 comprises instructions 804 which, when executed by the processor 802, cause the processor 802 to carry out tasks. In this example, the instructions 804 comprise instructions 806 to cause the processor 802 to separately identify internal and external dimensions of an object to be generated using additive manufacturing. The identification may include, for example, reviewing a data tag or label provided in object model data identifying the dimension as internal and/or external, or analyzing the object model data for example using vectors as described above, or in some other way. The instructions 804 further comprise instruction 808 to cause the processor 802 to apply a first geometrical transformation to a virtual model of the object to modify the identified internal dimensions and a second, different geometrical transformation to modify the identified external dimensions.

In some examples, the first geometrical transformation has an effect (or at least a component which has an effect) which is equal and opposite to the second geometrical transformation.

In some examples, the first geometrical transformation comprises at least one of a scaling (e.g., scaling factor) and an offset (e.g., an offset value). For example, the first geometrical transformation may be operable, based (at least in part) on an offset, to modify the internal dimensions and the second geometrical transformation may be operable, based (at least in part) on an offset that is equal and opposite to the offset associated with the first geometrical transformation, to modify the external dimensions.

In some examples, the instructions when executed cause the processor 802 to carry out any or any combination of the blocks of FIG. 1 and/or the blocks of FIG. 5. In some examples, the instructions may cause the processor 802 to act as any part of the processing circuitry 602, 702 of FIG. 6 or FIG. 7.

Examples in the present disclosure can be provided as methods, systems or machine-readable instructions, such as any combination of software, hardware, firmware or the like. Such machine-readable instructions may be included on a computer readable storage medium (including but not limited to disc storage, CD-ROM, optical storage, etc.) having computer readable program codes therein or thereon.

The present disclosure is described with reference to flow charts and/or block diagrams of the method, devices and systems according to examples of the present disclosure. Although the flow diagrams described above show a specific order of execution, the order of execution may differ from that which is depicted. Blocks described in relation to one flow chart may be combined with those of another flow chart. It shall be understood that each block in the flow charts and/or block diagrams, as well as combinations of the blocks in the flow charts and/or block diagrams can be realized by machine-readable instructions.

The machine-readable instructions may, for example, be executed by a general purpose computer, a special purpose computer, an embedded processor or processors of other programmable data processing devices to realize the functions described in the description and diagrams. In particular, a processor or processing apparatus may execute the machine-readable instructions. Thus functional modules of the apparatus (such as the geometrical compensation module 604, the model assessment module 706 and/or the print instructions module 704) may be implemented by a processor executing machine-readable instructions stored in a memory, or a processor operating in accordance with instructions embedded in logic circuitry. The term 'processor' is to be interpreted broadly to include a CPU, processing unit, ASIC, logic unit, or programmable gate array etc. The methods and functional modules may all be performed by a single processor or divided amongst several processors.

Such machine-readable instructions may also be stored in a computer readable storage that can guide the computer or other programmable data processing devices to operate in a specific mode.

Machine-readable instructions may also be loaded onto a computer or other programmable data processing devices, so that the computer or other programmable data processing devices perform a series of operations to produce computer-implemented processing, thus the instructions executed on the computer or other programmable devices realize functions specified by block(s) in the flow charts and/or in the block diagrams.

Further, the teachings herein may be implemented in the form of a computer software product, the computer software product being stored in a storage medium and comprising a plurality of instructions for making a computer device implement the methods recited in the examples of the present disclosure.

While the method, apparatus and related aspects have been described with reference to certain examples, various modifications, changes, omissions, and substitutions can be made without departing from the spirit of the present disclosure. It is intended, therefore, that the method, apparatus and related aspects be limited by the scope of the following claims and their equivalents. It should be noted that the above-mentioned examples illustrate rather than limit what is described herein, and that those skilled in the art will be able to design many alternative implementations without departing from the scope of the appended claims. Features described in relation to one example may be combined with features of another example.

The word "comprising" does not exclude the presence of elements other than those listed in a claim, "a" or "an" does not exclude a plurality, and a single processor or other unit may fulfil the functions of several units recited in the claims. Based on means based at least in part on.

The features of any dependent claim may be combined with the features of any of the independent claims or other dependent claims.

What is claimed is:

1. A method comprising:

receiving, by a processor, object model data for an object specifying a nominal value of an external dimension of the object and a nominal value of an internal dimension of the object;

determining, by the processor, a deviation between the nominal value and an actual value of an external dimension of the object generated from the object model data using an additive manufacturing apparatus, wherein the external dimension is defined between first and second surfaces of the object such that an outwards normal vector of the first surface does not intersect the second surface and such that an outwards normal vector of the second surface does not intersect the first surface;

determining, by the processor, a deviation between the nominal value and an actual value of an internal dimension of the object generated from the object model data using the additive manufacturing apparatus, wherein the internal dimension is defined between third and fourth surfaces of the object such that an outwards normal vector of the third surface intersects the fourth surface and an outwards normal vector of the fourth surface intersects the third surface;

based on the determined deviations, determining, by the processor, a scaling factor and a positive offset factor that best satisfy:

a product of the actual value of the external dimension and the scaling factor, minus the nominal value of the external dimension, being equal to the positive offset factor; and a product of the actual value of the internal dimension and the scaling factor, minus the nominal value of the internal dimension, being equal to $-1$ times the positive offset factor;

modifying, by the processor, the object model data, using the scaling factor and the positive offset factor, by:

multiplying the nominal value of the external dimension by the scaling factor and adding the positive offset factor, to modify the nominal value of the external dimension; and multiplying the nominal value of the internal dimension by the scaling factor and subtracting the positive offset factor, to modify the nominal value of the internal dimension;

generating, using the additive manufacturing apparatus, the object from the modified object model data in which the nominal values of the external and internal dimensions have been modified.

2. The method according to claim 1, wherein the external dimension is one of a plurality of external dimensions of the object for which deviations are determined, the internal dimension is one of a plurality of internal dimensions of the object for which deviations are determined, and the scaling factor and the positive offset factor are determined based on the determined deviations for the plurality of external dimensions and the determined deviations for the plurality of internal dimensions.

3. The method according to claim 1, where determining the scaling factor and the positive offset factor comprises fitting a linear regression line to a dataset comprising measured deviations from corresponding nominal dimensions of the object as a function of the nominal dimensions.

4. A system comprising:
a processor; and
a memory storing instructions executable by the processor to:
  modify object model data for an object, using a scaling factor and a positive offset factor, by:
  multiplying a nominal value of an external dimension specified in the object model data by the scaling factor and adding the positive offset factor, to modify the nominal value of the external dimension; and
  multiplying a nominal value of an internal dimension specified in the object model data by the scaling factor and subtracting the positive offset factor, to modify the nominal value of the internal dimension;
  generate, using an additive manufacturing apparatus, the object from the modified object model data in which the nominal values of the external and internal dimensions have been modified,
wherein the scaling factor and the positive offset factor best satisfy:
  a product of an actual value of an external object dimension and the scaling factor, minus an expected value of the external object dimension, being equal to the positive offset factor; and
  a product of an actual value of an internal object dimension and the scaling factor, minus the expected value of the internal object dimension, being equal to −1 times the positive offset factor,
wherein the external dimension is defined between first and second surfaces of the object such that an outwards normal vector of the first surface does not intersect the second surface and such that an outwards normal vector of the second surface does not intersect the first surface,
and wherein the internal dimension is defined between third and fourth surfaces of the object such that an outwards normal vector of the third surface intersects the fourth surface and an outwards normal vector of the fourth surface intersects the third surface.

5. The system according to claim 4, wherein the instructions are executable by the processor to further:
  determine a deviation between the nominal value and the actual value of the external dimension as generated from the object model data prior to modification, using the additive manufacturing apparatus;
  determine a deviation between the nominal value and the actual value of the internal dimension as generated from the object model data prior to modification, using the additive manufacturing apparatus; and
  determine the scaling factor and the positive offset factor based on the determined deviations.

6. The system according to claim 5, wherein the scaling factor and the positive offset factor are determined by fitting a linear regression line to a dataset comprising measured deviations from corresponding nominal dimensions of the object as a function of the nominal dimensions.

7. The system according to claim 4, further comprising the additive manufacturing apparatus.

8. A non-transitory machine-readable medium storing instructions executable by a processor to perform processing comprising:
  receiving object model data for an object specifying a nominal value of an external dimension of the object and a nominal value of an internal dimension of the object;
  determining a deviation between the nominal value and an actual value of an external dimension of the object generated from the object model data using an additive manufacturing apparatus, wherein the external dimension is defined between first and second surfaces of the object such that an outwards normal vector of the first surface does not intersect the second surface and such that an outwards normal vector of the second surface does not intersect the first surface;
  determining a deviation between the nominal value and an actual value of an internal dimension of the object generated from the object model data using the additive manufacturing apparatus, wherein the internal dimension is defined between third and fourth surfaces of the object such that an outwards normal vector of the third surface intersects the fourth surface and an outwards normal vector of the fourth surface intersects the third surface;
  based on the determined deviations, determining a scaling factor and a positive offset factor that best satisfy-satisfies:
    a product of the actual value of the external dimension and the scaling factor, minus the nominal value of the external dimension, being equal to the positive offset factor; and
    a product of the actual value of the internal dimension and the scaling factor, minus the nominal value of the internal dimension, being equal to −1 times the positive offset factor;
  modifying the object model data, using the scaling factor and the positive offset factor, by:
    multiplying the nominal value of the external dimension by the scaling factor and adding the positive offset factor, to modify the nominal value of the external dimension; and
    multiplying the nominal value of the internal dimension by the scaling factor and subtracting the positive offset factor, to modify the nominal value of the internal dimension;
  generating, using the additive manufacturing apparatus, the object from the modified object model data in which the nominal values of the external and internal dimensions have been modified.

9. The non-transitory machine-readable medium according to claim 8, wherein the external dimension is one of a plurality of external dimensions of the object for which deviations are determined, the internal dimension is one of a plurality of internal dimensions of the object for which deviations are determined, and the scaling factor and the positive offset factor are determined based on the determined deviations for the plurality of external dimensions and the determined deviations for the plurality of internal dimensions.

10. The non-transitory machine-readable medium according to claim 8, wherein the scaling factor and the positive offset factor are determined by fitting a linear regression line to a dataset comprising measured deviations from corresponding nominal dimensions of the object as a function of the nominal dimensions.

* * * * *